(12) United States Patent
Fanini et al.

(10) Patent No.: US 10,401,203 B2
(45) Date of Patent: Sep. 3, 2019

(54) MULTI-FREQUENCY MICRO INDUCTION AND ELECTRODE ARRAYS COMBINATION FOR USE WITH A DOWNHOLE TOOL

(71) Applicant: Baker Hughes Incorporated, Houston, TX (US)

(72) Inventors: Otto N. Fanini, Houston, TX (US); Mohamed Daoud, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 127 days.

(21) Appl. No.: 14/964,205

(22) Filed: Dec. 9, 2015

(65) Prior Publication Data

US 2017/0168188 A1 Jun. 15, 2017

(51) Int. Cl.
*G01F 1/58* (2006.01)
*G01V 3/20* (2006.01)
*G01V 3/28* (2006.01)
*G01F 1/74* (2006.01)

(52) U.S. Cl.
CPC ............... *G01F 1/588* (2013.01); *G01F 1/74* (2013.01); *G01V 3/20* (2013.01); *G01V 3/28* (2013.01)

(58) Field of Classification Search
CPC ........ G01V 3/104; G01F 1/588; E21B 47/102
See application file for complete search history.

(56) References Cited

U.S. PATENT DOCUMENTS

| | | | |
|---|---|---|---|
| 4,614,121 A | 9/1986 | Hansen | |
| 5,109,946 A * | 5/1992 | Sorrells | G01V 11/005 181/104 |
| 5,160,925 A * | 11/1992 | Dailey | E21B 47/011 175/40 |
| 5,442,294 A | 8/1995 | Rorden | |
| 5,610,331 A * | 3/1997 | Georgi | E21B 47/065 166/250.01 |
| 6,529,833 B2 | 3/2003 | Fanini | |
| 6,600,321 B2 | 7/2003 | Evans | |
| 6,677,756 B2 | 1/2004 | Fanini | |
| 6,978,672 B1 | 12/2005 | Chen | |
| 7,243,718 B2 | 7/2007 | Chen | |
| 7,545,145 B2 | 6/2009 | Wang | |
| 7,650,797 B2 | 1/2010 | Nielsen | |
| 8,129,994 B2 | 3/2012 | Wang | |

(Continued)

*Primary Examiner* — Jermele M Hollington
*Assistant Examiner* — Alvaro E Fortich
(74) *Attorney, Agent, or Firm* — Hogan Lovells US LLP

(57) ABSTRACT

A flowmeter for use in a borehole that includes a transmitter and receivers spaced axially away from the transmitter. Energizing the transmitter creates electrical field lines that extend between the transmitter and the receivers, and that pass through fluid flowing past the flowmeter. The magnitude of the electrical field lines at each of the receivers is measured, and varies in response to different types of fluid flowing past the flowmeter, and changes in phase of the fluid. Example transmitters and receivers include coils and electrodes. The transmitters and receivers can define elongate arrays, where the arrays are arranged parallel to, oblique, or perpendicular to an axis of the borehole. Multiple array orientations provide a radial cross sectional image of the flowing fluid. Thus not only can multi-phase flow be detected, but the type of flow regime can be identified.

20 Claims, 6 Drawing Sheets

(56) References Cited

U.S. PATENT DOCUMENTS

| | | | |
|---|---|---|---|
| 8,302,687 B2 | 11/2012 | Chen | |
| 8,305,083 B2 | 11/2012 | Wang | |
| 8,319,498 B2 | 11/2012 | Wang | |
| 8,508,231 B2 | 8/2013 | Wang | |
| 2002/0054727 A1* | 5/2002 | Song | G02B 6/12007 385/16 |
| 2002/0140425 A1* | 10/2002 | Prammer | G01R 33/307 324/303 |
| 2005/0068850 A1* | 3/2005 | Muyzert | G01V 1/286 367/38 |
| 2005/0093547 A1* | 5/2005 | Xiao | G01V 3/28 324/339 |
| 2006/0196817 A1* | 9/2006 | Crewson | B03C 5/02 210/223 |
| 2007/0051685 A1* | 3/2007 | Wittmer | C02F 1/484 210/695 |
| 2007/0108380 A1* | 5/2007 | Poe | E21B 47/1015 250/269.6 |
| 2007/0247329 A1* | 10/2007 | Petrovic | G01V 11/002 340/854.4 |
| 2009/0166035 A1* | 7/2009 | Almaguer | E21B 7/061 166/254.1 |
| 2009/0217711 A1* | 9/2009 | May | G01D 5/145 68/12.04 |
| 2010/0225322 A1* | 9/2010 | Kramer | G01V 3/16 324/339 |
| 2010/0264915 A1 | 10/2010 | Saldungaray | |
| 2011/0073368 A1* | 3/2011 | Han | E21B 47/01 175/40 |
| 2012/0084021 A1* | 4/2012 | Jones | E21B 47/10 702/45 |
| 2012/0161540 A1* | 6/2012 | Moon | H04B 5/0075 307/104 |
| 2013/0110401 A1* | 5/2013 | Hsu | G01V 13/00 702/6 |
| 2013/0118733 A1* | 5/2013 | Kumar | E21B 41/0085 166/254.2 |
| 2013/0234717 A1 | 9/2013 | Wang | |
| 2013/0248250 A1* | 9/2013 | Bittar | E21B 47/00 175/45 |
| 2014/0067272 A1* | 3/2014 | San Martin | G01V 3/38 702/7 |
| 2014/0110105 A1* | 4/2014 | Jones | E21B 47/10 166/250.01 |
| 2014/0285204 A1* | 9/2014 | Okonkwo | E21B 47/011 324/333 |
| 2015/0032376 A1* | 1/2015 | Hou | G01V 3/26 702/7 |
| 2016/0102528 A1* | 4/2016 | Wise | E21B 7/00 166/336 |

\* cited by examiner

MULTI-FREQUENCY MICRO INDUCTION AND ELECTRODE ARRAYS COMBINATION FOR USE WITH A DOWNHOLE TOOL

BACKGROUND OF THE INVENTION

1. Field of Invention

The present disclosure relates to a system and method for monitoring fluid content and flow in a downhole bore with induced magnetic and electrical fields using multi-frequency, micro-induction, electrode arrays with induction coils, and electrode galvanic voltage and impedance electrical measurements.

2. Description of Prior Art

Flowmeters are often used for measuring single and multi-phase fluid flow rates and patterns produced from hydrocarbon producing wellbores. Flowmeters may be deployed downhole within a producing wellbore, a jumper or caisson used in conjunction with a subsea wellbore, or a production transmission line used in distributing the produced fluids. Monitoring fluid produced from a wellbore is useful in wellbore reservoir production evaluation, and to project production life of a well. The produced fluid may include water and/or gas mixed with liquid hydrocarbon. Knowing the water fraction is desirable to ensure adequate infrastructure means and capacity are available for separating, storing, and reinjecting as needed, the water from the produced fluid. Additionally, the amount and presence of gas is another indicator of wellbore performance, and vapor mass flow impacts transmission requirements. In wells having a network of wellbores, it is useful to estimate which producing bores produce different types of fluid.

Flowmeters can be employed that provide information regarding total flow, water cut amount, gas fractions, production stability, and flow regimes. However, these often require periodic analysis of the fluid entering the flowmeter. This may involve deploying a sample probe upstream of the flowmeter; which can produce inaccuracy, and may interrupt or temporarily halt fluid production. The types of flowmeters range from pressure differential, spinner type meters, thermal pulse, and capacitive sensors.

SUMMARY OF THE INVENTION

Disclosed herein is an example of a flowmeter for use in monitoring a flow of fluid in a borehole, which in one example includes a transmitter, a power source in electrical communication with the transmitter, and receivers spaced away from the transmitter at strategic locations, so that when the power source energizes the transmitter, electrical field lines are generated that extend between the transmitter and the receivers and that intersect with substantially an entire radius of the flow of fluid. The power source can be selectively operated at different frequencies. Optionally, the transmitters and receivers are made up of coils, electrodes, or combinations thereof. In an example, the transmitter and receivers form an elongate linear array, and wherein the receivers are spaced apart from one another at different distances. In one example, the array is a first array, and the flowmeter can have a second array with an axis that is oblique to an axis of the first array. Optionally included is a third array that is substantially perpendicular to the first array. One of the receivers can be a coil and the flowmeter can further include a bucking coil coupled with the coil. In one alternative, the transmitter and receivers are made up of a coil connected to an electrode.

Also disclosed herein is a method of monitoring a flow of fluid in a borehole. In one example the method includes generating electrical field lines in the flow of fluid, strategically forming the electrical field lines so that at least some of the lines extend to radial distances from an axis of the borehole that are greater than radial distances to which other of the lines extend, monitoring the electrical field lines at a location distal from a location where the electrical field lines are generated, and identifying a characteristic of the fluid based on the step of monitoring. In an example, one of the electrical field lines extends substantially to an outer radius of the borehole. One example characteristic of the fluid is a phase of the fluid. The step of identifying a characteristic of the fluid includes identifying a flow regime of the fluid. In an alternative, the step of generating electrical field lines in the flow of fluid involves providing a transmitter and receivers in the borehole, supplying electricity to the transmitter disposed in the borehole, and varying a frequency of the electricity. The receivers can be spaced at designated locations with respect to the transmitter so that the electrical field lines are strategically formed. Optionally, the electrical field lines in the flow of fluid make up a first set of lines, the method further includes generating a second set of electrical field lines that extend along a path that is oblique to a path along which the first set of lines extend and monitoring the second set of electrical field lines at a location distal from where the electrical field lines are generated. The method can further include generating a three dimensional model of the fluid regime based on the steps of monitoring the first and second electrical field lines.

Another example of a flowmeter for use in monitoring a flow of fluid in a borehole includes a transmitter, a power source in electrical communication with the transmitter that is selectively operated at different frequencies, and receivers spaced away from the transmitter at strategic locations, so that when the power source energizes the transmitter, electrical field lines are generated that extend between the transmitter and the receivers, and that project along paths that are angularly offset from one another. In one embodiment, the receivers and the transmitters define a first array assembly, the flowmeter further having a second array assembly that is oriented at an angle to the first array assembly. In another alternative, the receivers and the transmitters define a first array assembly, the flowmeter further having a second array assembly that is oriented perpendicular to the first array assembly. Optionally, the receivers are disposed at designated locations from the transmitter so that the electrical field lines to a one of the receivers depend a distance radially away from an axis of the borehole that is different from electrical field lines that extend to another one of the receivers, and so that electrical field lines to a receiver farthest away from the transmitter, depend substantially to an outer radius of the borehole.

BRIEF DESCRIPTION OF DRAWINGS

Some of the features and benefits of the present invention having been stated, others will become apparent as the description proceeds when taken in conjunction with the accompanying drawings, in which:

FIG. 4 is an axial view of the flow meter of FIG. 2 and taken along lines 4-4.

Figure 1:
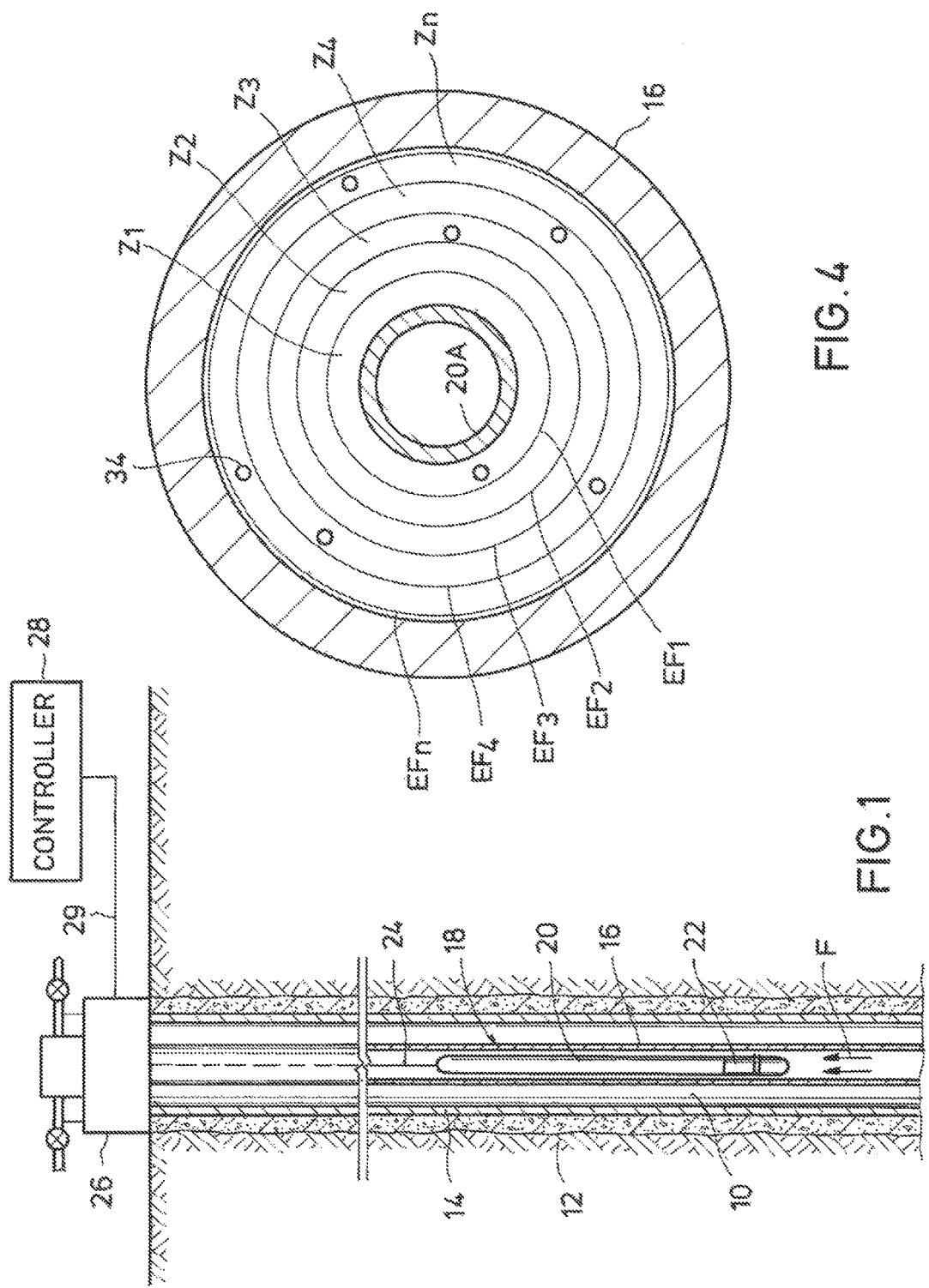
FIG. 1 is a side sectional view of an example of a downhole tool with a flowmeter and which is disposed in a wellbore.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

FIG. 1 shows in partial sectional view an example of a wellbore 10 formed through a formation 12. In the example, casing 14 lines the wellbore 10 and in which a length of production tubing 16 is inserted. Coursing through production tubing 16 is a flow of fluid F, which was extracted from formation 12. Also disposed in tubing 16, and in the path of the flow of fluid F, is a downhole tool 18 which is made up of a housing 20 and a flow sensor 22 disposed in the housing 20. In the illustrated example, flow sensor 22 is equipped for sensing and monitoring the flow of fluid F. Downhole tool 18 is shown deployed within tubing 16 on a wireline 24. Tool 18 can also be deployed via tubing, coiled tubing, cable, slick line, or other known or later developed means. An end of wireline 24 distal from its connection to tool extends through a wellhead assembly 26. Outside of wellhead assembly 26, wireline 24 can be spooled up on a reel, such as on a surface truck (not shown) on surface. A controller 28 is shown in communication with wellhead assembly via a communication means 29, and through which controller 28 can be in communication with downhole tool 18 and flow sensor 22. As such, information sensed by flow sensor 22 can be uploaded as data via wireline 24 to controller 28.

Figure 2:
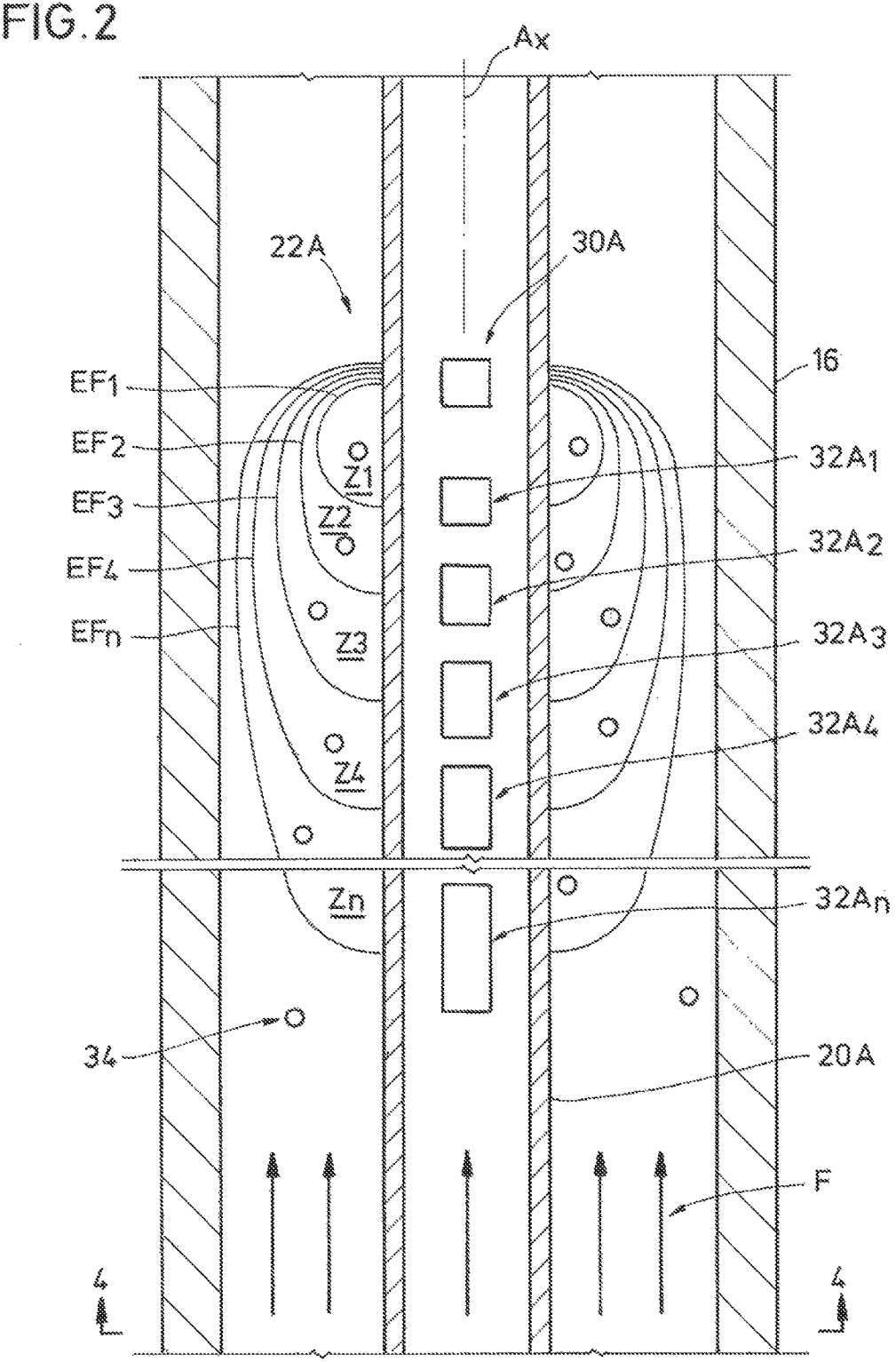
FIG. 2 is a side partial sectional view of an example of the flowmeter of FIG. 1.

FIG. 2 depicts in a side partial sectional view an alternate embodiment of flow sensor 22A disposed within tubing 16. In the illustrated example, flow sensor 22A includes a transmitter 30A shown coupled with housing 20A. Receivers $32A_{1-n}$ are also shown mounted on housing and at axially spaced locations away from transmitting A. Further shown are electrical field lines $EF_{1-n}$ that extend respectively from transmitter to each of the receivers $32A_{1-n}$. The electrical field lines are illustrated with the flowmeter configuration for array impedance measurements performed driving electrical current flow along the fluid flow path between transmitter and receiver electrodes arrays with multiple transmitter-receiver spacings. In one example, the supporting and mounting structure for the arrays is non-conductive so not to interfere with the fluid flow measurements. The electrical field lines and corresponding driven electrical current's path can be defined by the transmitter electrode(s) location(s), electrical current return electrode(s) and the fluid flow media conductivity distribution. Impedance measurement and voltage measurements can be performed between one or more electrodes acting as transmitters sourcing measured electrical currents and one or more electrodes capable of performing voltage and impedance measurements. In one example, transmitter 30A is energized, such as with electricity, to generate the electrical field lines $EF_{1-n}$, that as illustrated, extend respectively to the receivers $32A_{1-n}$. In the example depicted, the electrical field lines $EF_{1-n}$ are formed so that they each depend a radial distance away from an axis $A_X$ of the flow sensor 22A that is different from the radial distance that other electrical field lines $EF_{1-n}$ extend. In one embodiment, the strategic localizing of the receivers $32A_{1-n}$, and with respect to transmitter 30A, creates the designated arrangement of the electrical field lines $EF_{1-n}$ with its corresponding spatial geometric response sensitive to a selected portion of the fluid flow cross-section. Optionally, the frequency of the electricity supplied to transmitter 30A can be adjusted to affect the arrangement, size, and/or path of the electrical field lines $EF_{1-n}$ and segregate in the frequency domain simultaneous receiver signal measurements excited by different transmitter orientations or transmitters in different arrays, it is believed it is within the capabilities of those skilled in the art to make the appropriate receiver spacing and frequency adjustments in order to achieve this effect.

By monitoring the magnitude of the current generated by the electrical field lines $EF_{1-n}$ at the different receivers $32A_{1-n}$, the presence of different phases of fluid in the flow fluid F can be detected. For example, shown in the example of FIG. 2 are representations of gas or vapor 34 that are intermixed within the flow of fluid F. As is known, amounts of gas or vapor 34 passing through or across the electrical field lines $EF_{1-n}$ affects the resulting measurements taken at the receivers $32A_{1-n}$. Monitoring these changes over time can indicate the presence of these different phases (i.e. liquid, gas, or vapor) in the flow of fluid F. Moreover, the presence of water in the flow of fluid F may also be detected by monitoring outputs from the receivers $32A1_{1-n}$. The designated arrangement of the electrical field lines $EF_{1-n}$ is created by the strategic placement of the receivers $32A_{1-n}$. Defined between adjacent electrical field lines $EF_{1-n}$ are zones $Z_{1-n}$. Zones $Z_{1-n}$ can be selectively surveyed, and zones $Z_{1-n}$ can be by each spacing spatial array geometric sensitivity response. Thus comparing readings from the different receivers $32A_{1-n}$, an image of the phases making up the flow of fluid F can be constructed, so that the flow regime of the flow of fluid F can be identified. The identification of the flow regime of the flow of fluid F can be instantaneous or over time. Correlation of the elapsed time-domain observation of micro coil and electrode measurements within an array and between different arrays can infer linear flow velocity of each phase along the tubular or borehole. Examples of flow regimes include slug flow, bubble flow, wavy flow, annular flow, and the like. The flow sensor 22A can also indicate if the flow of fluid F is all liquid, all gas, or all vapor. Moreover, this information can be used subsequently to measure the flow rate of the fluid F.

Figure 3:
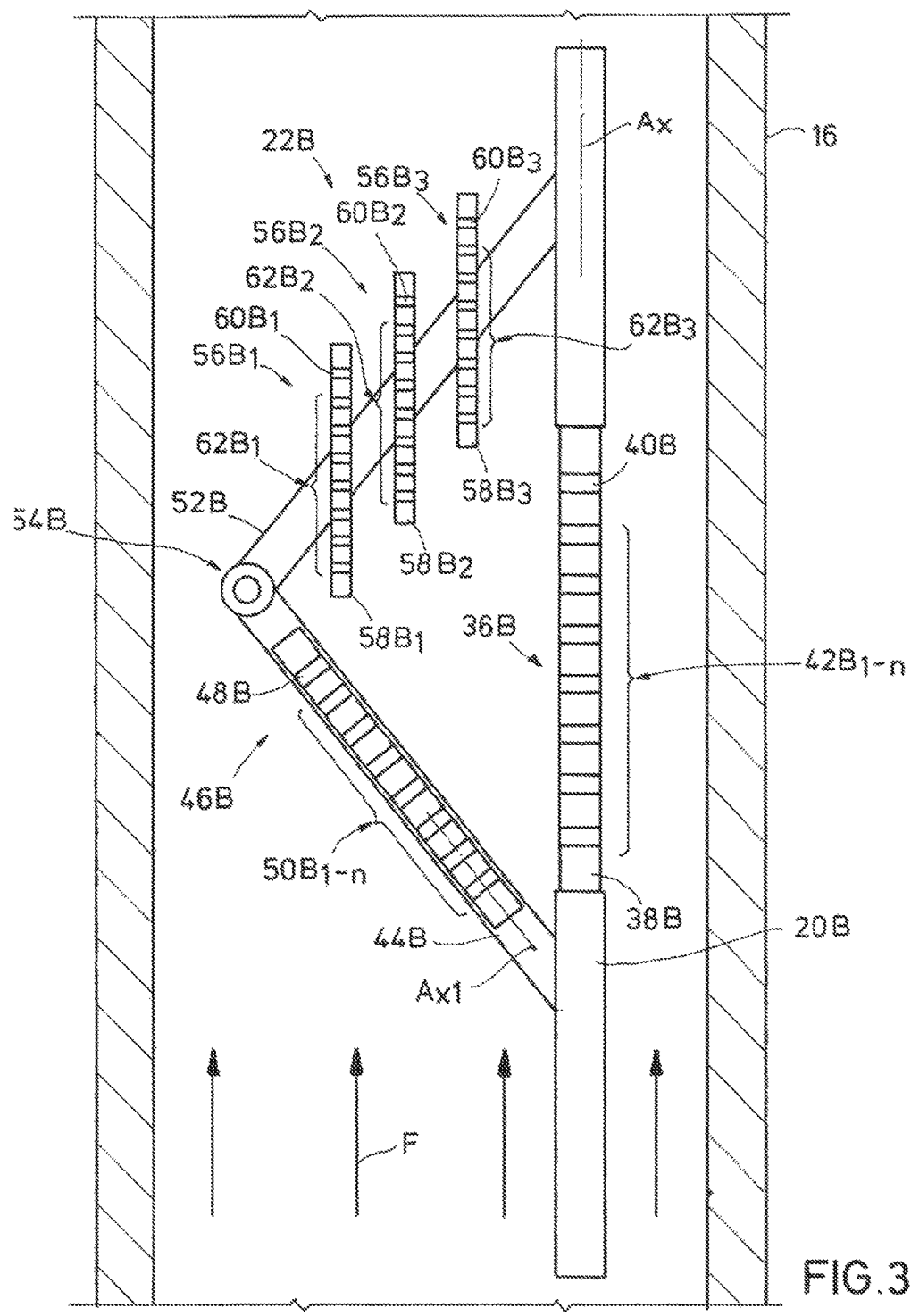
FIG. 3 is a side partial sectional view of an alternate embodiment of the flowmeter of FIG. 1.

Shown in FIG. 3 is an alternate embodiment of the flow sensor 22B. In this example, inserted within housing 20B is an array assembly 32B which includes a mounting bar 38B to which transmitter 40B and receivers $42B_{1-n}$ are coupled. Array assembly 36B operates in much the same manner as the transmitter 30A and receivers $32A_{1-n}$ of FIG. 2. In an illustrated example, array assembly 36B is substantially aligned with axis $A_X$ of housing 20B. Mounted onto housing 20B upstream of mounting bar 38B is an upstream arm 44B which is an elongated member and which extends along an axis $A_{X1}$ which is angled with respect to axis $A_X$. An array assembly 46B is shown mounted on upstream arm 44B which includes a transmitter 48B and receivers $50B_{1-n}$. Pivotingly coupled to an end of upstream arm 44B distal from housing 20B is a downstream arm 52B that connects to upstream arm 44B via a pivoted connection 54B. Pivoted connection 54B allows upstream and downstream arms 44B, 52B to pivot with respect to one another while still being coupled together. Transversely mounted on downstream arm 52B at different elevations are array assemblies $56B_{1-3}$, wherein the array assemblies $56B_{1-3}$ are arranged in an orientation that is substantially parallel with axis $A_X$. In an example, an array assembly $56B_{1-3}$ and 46B operate in similar fashion to array assembly 36B. Moreover, each of the array assemblies $56B_{1-3}$ includes a mounting bar $58B_{1-3}$, a transmitter $60B_{1-3}$, and set of receiver $62B_{1-3}$. In one example, as carrier arms 44B, 52B and deployment members pivot around pivoted connection 54B as these arms are deployed open in different tubular diameters the mounting bar $58B_{1-3}$ also pivot properly tilting around its supporting rotating joint to maintain a designated measurement orientation with respect to the fluid flow. Each of these sets of receivers $62B_{1-3}$ includes a designated number of receivers. Additional flexing arm assemblies with carrier arms 44B, 52B and pivoted connection 54B can be added around the flowmeter in order to add azimuthal fluid flow sensitivity to resolve the fluid flow phase distribution pattern.

In one example of operation, by placing flow sensor 22B and tubing 16 and in the path of flow fluid F the respective transmitters 40B, 48B, and $60B_{1-3}$ of each of the associated array assemblies 36B, 46B, and $56B_{1-3}$ are energized so that electrical field lines (not shown) are formed within the flow of fluid F. The oblique orientation of array assembly 46B forms electrical field lines, and zones along a path that is different from flux lines formed from array assemblies 36B or $56B_{1-3}$. The resulting information available from analyzing data recorded by the receivers $50B_{1-n}$, $42B_{1-n}$, and from receiver sets $62B_{1-3}$, can provide information about the flow of fluid F at more discreet locations within the tubing 16. For example, by cross correlating information from an electrical field line passing from transmitter 48B to receiver $50B_1$, with an electrical field line from 40B to 42Bn, the presence of a different phase of fluid may be identified within specific radial and azimuthal locations within tubing 16. Accordingly, a more definitive image of the fluid flow regime can be constructed by comparison of results from these different receivers. The present disclosure covers not only the orientations illustrated herein, but any flow sensor having more than one array assembly disposed in a flow of fluid, and wherein at least one of the array assemblies is oriented at an angle with other array assemblies, and wherein at least one of the array assemblies is spaced radially or axially away from a one of the other array assemblies.

Referring now to FIG. 4, shown in an axial sectional view is an example of the flow sensor 22A and housing 28 of FIG. 2 disposed within tubular 16, and taken along lines 4-4. When viewed axially, the electrical field lines $EF_{1-n}$ appear as concentric rings and define the associated zones $Z_{1-n}$ to occupy generally annular spaces. Accordingly, when the gas or vapor 34 within a particular zone is sensed by one of the receivers $32A_{1-n}$ (FIG. 2) the azimuthal location of the gas or vapor 34 is not identified. But only in which of the zones $Z_{1-n}$ the gas or vapor 34 is sensed. However, the arrangement of the flow sensor 22B of FIG. 3 can identify the radial and azimuthal location of where the flow of fluid F has a different phase.

Figure 5:
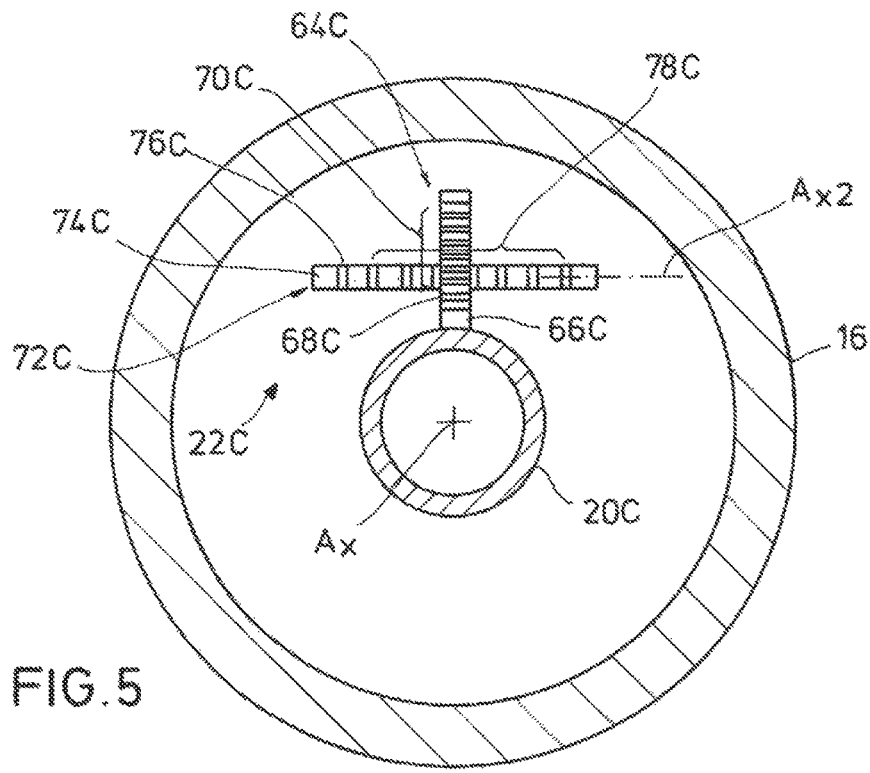
FIG. 5 is an axial view of an alternate embodiment of the flowmeter of FIG. 3.

Illustrated in FIG. 5 is another alternate embodiment of a flow sensor 22C mounted on housing 20C. Here the flow sensor 22C includes an array assembly 64C having a mounting bar 66C mounted on an outer surface of housing 20C and which extends radially outward from an axis $A_X$ of housing 20C. A transmitter 68 and set of receivers 70C are shown mounted on mounting bar 66C. One example, mounting bar 66C is at an angle oblique with axis $A_X$. Further included with flow sensor 22C is an array assembly 22C which extends generally transverse to axis $A_X$ and at a distance spaced radially outward from an outer surface of housing 20C. Array assembly 72C includes an elongate mounting bar 74C and on which a transmitter 76C and set of receivers 78C are coupled with. In an example, each set of receivers 70C and 78C include receivers having a configuration the same or similar to receivers 32A of FIG. 2. Array assemblies 74C and 72C operate in much the same fashion as the transmitter 30A and receiver $30A_{1-n}$ of FIG. 2. As such, in this example electrical field lines (not shown) are generated that follow paths that are normally perpendicular to one another. Further, flow sensor 22C can include another array assembly (not shown) that is generally aligned with axis $A_X$. Accordingly, different sets of electrical field lines can be created that follow three axes that are each perpendicular to the other. In this example, the electrical field lines can extend radially outward to the inner surface of the tubular 16, and so that substantially all of the cross sectional area of tubular 16 is imaged by the electrical field lines so that a three dimensional cross sectional area of the tubing 16 is interrogated for evaluating regimes of the flow of fluid flowing therethrough.

Figure 6:
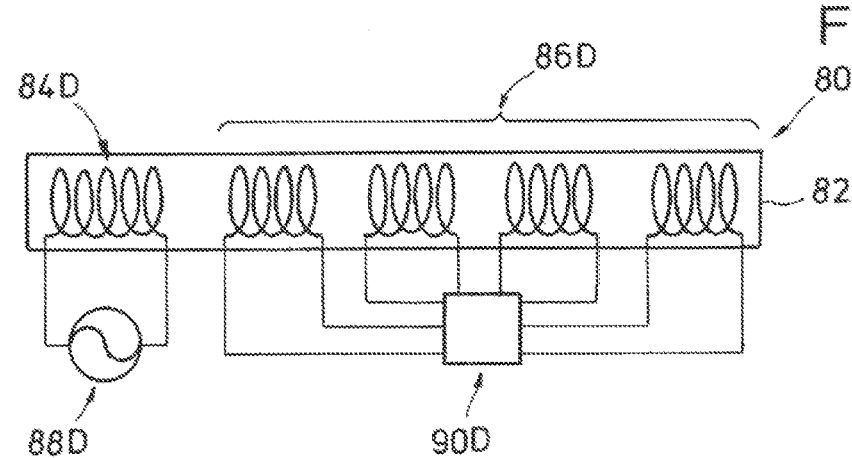
FIGS. 6 and 7 are schematic illustrations of alternate embodiments of array assemblies.

An alternate embodiment of an array assembly 80D is shown in a schematic view in FIG. 6. In this example the array assembly 80D includes an elongate mounting bar 82D with transmitter 84D in a set of receivers 86D. Here the transmitter 84D and set of receivers 86D are each formed from a wound conducting element that defines a coil. Moreover, an electrical source 88D is shown connected to transmitter 84D. Optionally, a meter 90D connects to each of the individual coils making up the set of receivers 86D so that they may be individually monitored to detect any current from the electrical field lines that extend between the transmitter 84D and set of receivers 86D. Measurements can be performed within the same array or between different arrays.

Bucking coils can be used to subtract the direct field irradiated from the transmitter so that combined sensed signals by the coils and the bucking coils contain measurement information focused mostly on the fluid flow characteristics, and with minimal interference from the transmitter field. This induction measuring method is usually referred to as a three-coil array, being the transmitter coil and two connected receiver coils namely the subtracting bucking coil and the main receiver coil. A micro induction array can be formed by a transmitter coil and an array of paired, compensated and connected bucking and main receiver coils. The coil could be driven in the transmitter or sensed in the receiver differentially. The various electrodes could be symmetrically connected to the coils' center-taps driven or measured in common-mode. The transmitters' electrodes could be electrically excited simultaneously in any sequence or combination. Similarly the receiver's electrodes could also be electrically sensed simultaneously in any sequence or combination. This transmitter-receiver electrode measurement sequencing and combinability flexibility allows the flowmeter to focus on different fluid flow volumes and cross-sections to improve the fluid flow resolution and spatial coverage. The transmitter's electrodes could excite the flow media to enable the measurement of the induced voltages in the receiver's electrode. Alternatively the transmitter-receiver electrode measurement combinations could measure the electrical impedance between the transmitter and receiver electrodes. In one example, the transmitter receiver electrode combination measurements evaluate conductive fluid flow paths between the transmitter and receivers. The transmitter coils can induce secondary magnetic fields associated with induced currents in conductive volumes of the fluid flow which are consequently sensed by the receiver coil arrays. The transmitter-receiver measurements can be performed within the same array, between coils with similar orientation, between coils with different orientations, or performed between different arrays. In one example, electrical fields induced by the flowmeter's transmitters are associated with corresponding magnetic and vice-versa as allowed by the fluid flow media governed by the four fundamental Maxwell's equations of electromagnetism.

Figure 7:
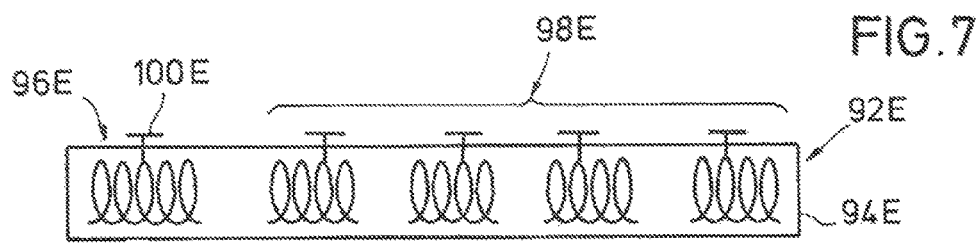

FIG. 7 illustrates a side view of a schematic representation of an alternate array assembly 92E which includes a mounting bar 94 on which a transmitter 96E and set of receivers 98E are provided. Each of the receivers 96E and set of receivers 98E are represented as coils. Additionally, an electrode 100E is shown connected on each of the coils of this example. These coils can be electrically isolated from both the tool assembly and the fluid flow. The fluid flow surveying electrical currents can selectively be controlled to flow between array electrodes to properly measure voltages, impedances, and injected current within the flow therefore characterizing the flow regime. In an example electrodes 100E are exposed in direct contact with the fluid flow and can be preferably connected to the coil's center-taps to perform with balanced electrical impedance galvanic measurements within the fluid flow media. Optionally collocated array coils (not shown) with multiple survey orientations can be collocated and mounted on the same mounting bar. A collocated bar assembly of multiple coil array assemblies can be oriented in multiple directions (e.g. x, y and z) to provide a three-dimensional volumetric sensitivity between the various arrays to properly survey the entire fluid flow cross-section. Coil array measurements can be sensitive to fluid flow within the directions in the transmitter coil plane in a homogeneous flow media. In non-homogeneous production flow the contact planes between different fluid flow components can produce cross-component measurement signals when the array transmitter's magnetic field excitation is applied in one orientation, and a resulting receiver signal is sensed in an array receiver coil (e.g. x or y) with an orientation different from the from the transmitter's (e.g. z) orientation. In non-homogeneous fluid flow media there could be measurement cases with induced electrical eddy currents constrained by non-continuous electrical current flow path.

Figure 8:
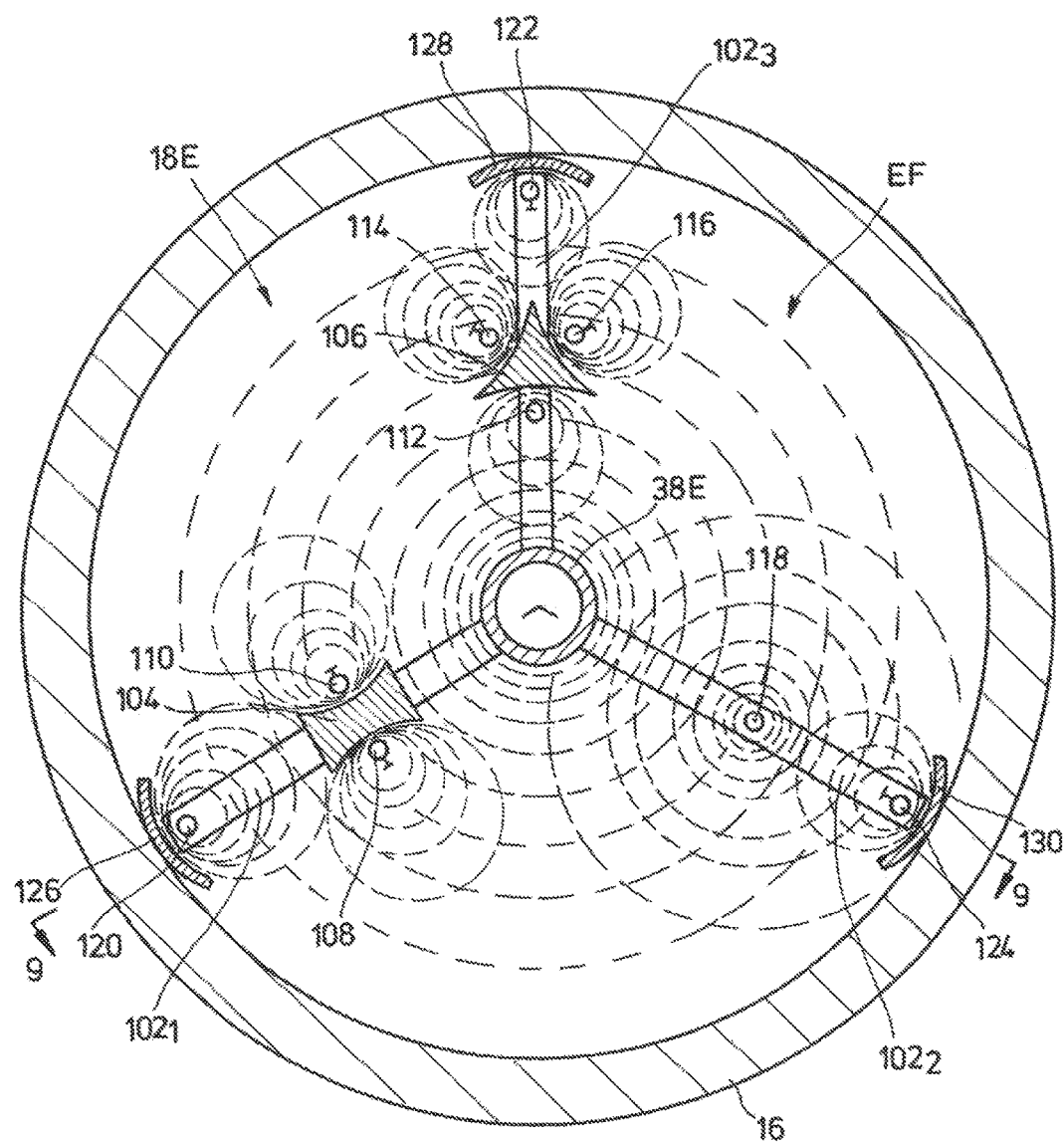
FIG. 8 is an axial view of an alternate embodiment of the downhole tool of FIG. 1.

Shown in axial view in FIG. 8, is an example of an alternate embodiment of downhole tool 18E. Here downhole tool 18E includes axial mounting bar 38E and upstream arms $102_1$, $102_2$, $102_3$ that project radially outward from bar 38E. Reflector 104 is shown mounted on arm $102_1$, and reflector 106 is on arm $102_3$. In one embodiment micro-induction coil and electrode arrays are mounted with a particular reflector orientated along a direction of the fluid flow, which in one example can increase azimuthal directionality sensitivity to improve fluid flow component spatial resolution and identification. A micro-induction coil and electrode array and reflector assembly can be mounted in a particular arms location in groups of two or more micro-arrays that can provide different levels of azimuthal fluid flow measurement resolution sensitivity. As shown in the example of FIG. 8, electrical field (EF) lines associated with respective magnetic field lines, magnetic flux lines, and corresponding Hertz potential are illustrated in dashed lines for the case of an electromagnetically homogeneous fluid flow. Further illustrated in FIG. 8 is a gap between the reflector and the micro induction coil and electrode array; which illustrates how microarray induction to sufficiently irradiates surveying magnetic flux into the fluid flow to reach required fluid flow spatial resolution and sensitivity. Alternatively this gap can be filled partially with ferrite material to increase the micro-array induction fluid flow sensitivity. Reflector 104 has two reflector sides, with array 108 on one side and array 110 on the other. Electrical fields EF are generated by arrays 108, 110, whose shapes and orientations are formed by reflecting from reflector $104_n$, and which can increase azimuthal fluid flow survey sensitivity. Reflector 106 has three reflector sides, with arrays 112, 114, and 116 disposed adjacent each of the reflector sides. Similarly, electrical fields EF are generated by micro-arrays 112, 114, and 116 whose shapes and orientations are formed by reflecting from the reflecting surface of reflector 106. An array 118 is provided on arm $102_3$, however, no reflector is provided on arm $102_3$ adjacent array 118. Further, arrays 120, 122, 124 are provided on the ends of arms $102_1$, $102_2$, $102_3$ that are distal from bar 38E. Reflectors 126, 128, 130 are provided on the ends of arms $102_1$, $102_2$, $102_3$ that direct electrical fields generated by arrays 120, 122, 124 as shown. Arrays 108, 110, 114, 116, and 122 are shown having optional electrodes; however embodiments exist wherein electrodes are included with all arrays disclosed herein.

Figure 9:
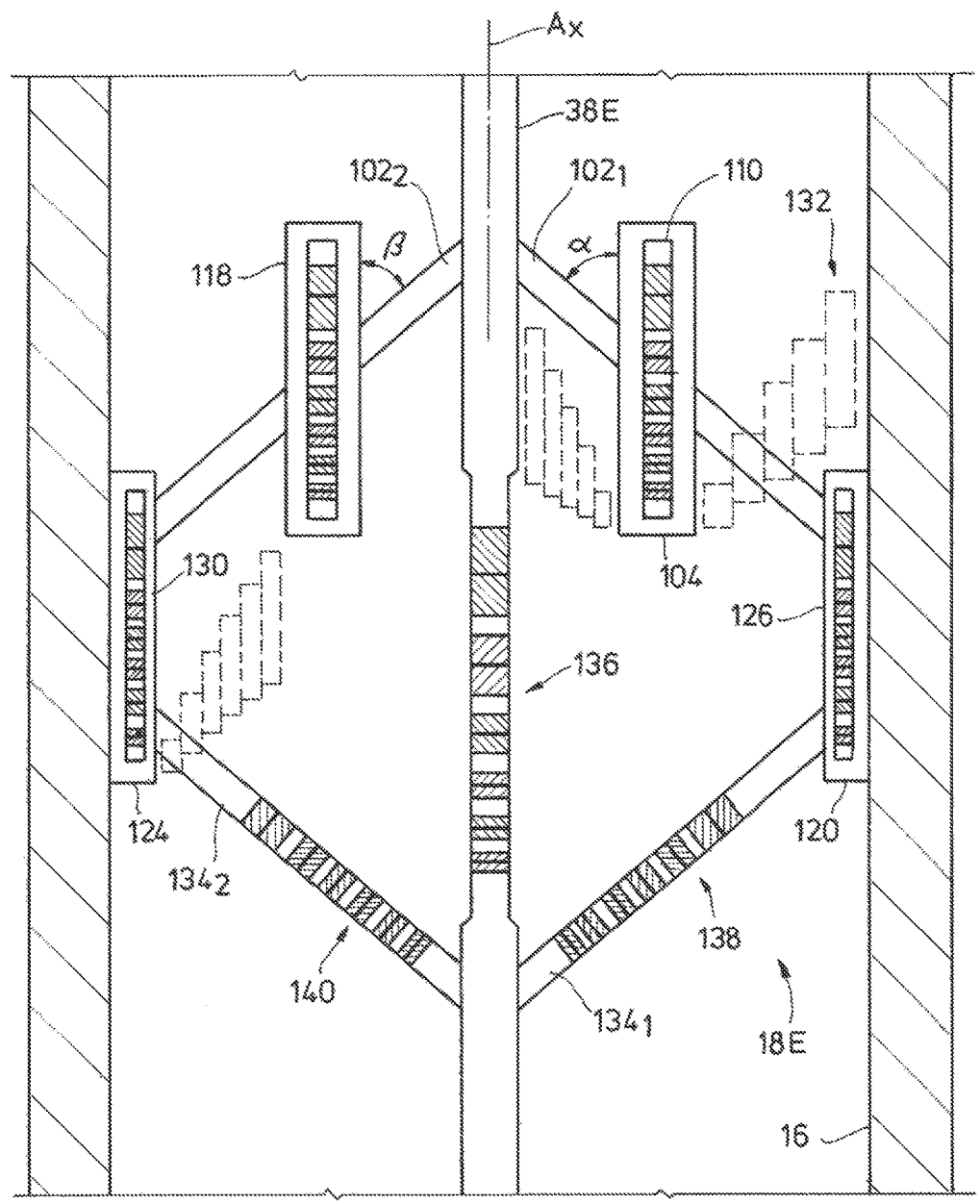
FIG. 9 is a side partial sectional view of the downhole tool of FIG. 8 and taken along lines 9-9.

FIG. 9 shows in a side partial sectional view, an axial illustration of the downhole tool 18E of FIG. 8, and along lines 9-9. As shown, micro-arrays 110, 118 are elongated members and are arranged generally parallel with axis $A_X$ of mounting bar 38E; whereas arms $102_1$, $102_2$ are oriented oblique to mounting bar 38E In the illustrated example, array 110 is oriented at an angle α with respect to arm $102_1$, and array 118 is oriented at an angle β with respect to arm $102_2$. The spatial area of observation of array 110 is schematically illustrated as boxes 132 having dashed outlines for an electromagnetically homogeneous fluid flow media. As shown, the boxes 132 increase in size with distance away from the transmitter of the array 110. Micro-array induction data can be processed with inversion or focused spatial filtering to estimate the fluid electrical characteristics and possibly identify the type of fluid in each one of the dashed rectangular (boxes) zones in 132. As the flow regime interpretation processing focuses on extracting an estimate from the micro-array data, which is from a rectangle of fluid flow volume further away from the micro-array (radial sounding), the volumetric characterization resolution can diminish—resulting in the fluid characteristics estimation averaging over a larger rectangle (dashed boxes in 132) decreasing the volumetric fluid flow estimate certainty. Conversely as the flow regime interpretation processing focuses on extracting from the micro-array data, an estimate from a rectangle of fluid flow volume closer to the micro array (radial sounding), the volumetric characterization resolution can increase, resulting in the fluid characteristics estimation averaging over a smaller rectangle (dashed boxes in 132) increasing the volumetric fluid flow estimate certainty. Also included with this embodiment of downhole tool 18E are downhole arms $134_1$, $134_2$, that have ends that mount to mounting bar 38E and whose distal ends couple to arrays 120, 124 and reflectors 126, 130. Included on mounting bar 38E is a micro-array 136, and micro-arrays 138, 140 are shown on arms $134_1$, $134_2$.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. For example, embodiments exist wherein the array assemblies described herein can include multiple arrays, wherein the transmitters and receivers of each array include coils oriented in substantially the same direction, and wherein additional arrays each have transmitters and receivers made up of coils that are oriented in a different direction. Moreover, the coils of different arrays can be mounted on a single frame—where the frame can include two coils or more coils, wherein the coils on the same frame are oblique or perpendicular to one another. Mounting bars described herein can be non-conductive. All embodiments of the flow meters described herein can be used in any orientation of wellbore, i.e. vertical, horizontal, or deviated. These and other similar modifications will readily suggest themselves to those skilled in the art, and are intended to be encompassed within the spirit of the present invention disclosed herein and the scope of the appended claims.

What is claimed is:

1. A device for use in monitoring fluid in a borehole comprising:
   an electro-magnetic transmitter;
   a power source in electrical communication with the transmitter; and
   electro-magnetic receivers spaced axially away from the electro-magnetic transmitter at strategic locations, so that when the power source energizes the electro-magnetic transmitter, electrical field lines are generated that extend from the electro-magnetic transmitter to the electro-magnetic receivers and remain substantially within the borehole and in a path of fluid flowing within the borehole, and that result in a current in the electro-magnetic receivers having a magnitude that is dependent on a phase of the fluid intersected by each of the electrical field lines.

2. The device of claim 1, wherein a portion of the fluid in the borehole is flowing in an annular space that is around the electro-magnetic transmitter and electro-magnetic receivers and which defines a fluid flow, wherein the electrical field lines each have a mid-portion disposed a radial distance from an axis of the device, wherein each radial distance is less than a distance between the axis and a sidewall of the borehole, and wherein radial distances of mid-portions of electrical field lines extending to electro-magnetic receivers spaced farther away from the electro-magnetic transmitter are greater than radial distances of mid-portions of electrical field lines extending to electro-magnetic receivers spaced closer to the electro-magnetic transmitter.

3. The device of claim 1, further comprising a housing that is selectively inserted into the borehole and in a path of a flow of fluid, wherein the transmitter and receivers are disposed in the housing and arranged along a line that is substantially parallel with an axis of the borehole.

4. The device of claim 1, wherein the electro-magnetic transmitter and electro-magnetic receivers comprise an elongate linear array, and wherein the electro-magnetic receivers are spaced apart from one another at different distances.

5. The device of claim 4, wherein the array comprises a first array, the device comprising a second array having an axis that is oblique to an axis of the first array.

6. The device of claim 5, further comprising a third array that is substantially perpendicular to the first array.

7. The device of claim 5, further comprising reflectors set adjacent to the electro-magnetic transmitters of the arrays, and wherein at least some of the electrical field lines reflect from surfaces of the reflectors for providing an azimuthal evaluation of fluid flowing in the borehole.

8. The device of claim 1, wherein a first one of the electrical field lines comprises a first mid-portion that is at a first radial distance from the axis, wherein the first one of the electrical field lines extends to a first one of the electro-magnetic receivers, wherein a second one of the electrical field lines comprises a second mid-portion that is at a second radial distance from the axis, wherein the second one of the electrical field lines extends to a second one of the electro-magnetic receivers, wherein the first radial distance is greater than the second radial distance, and wherein the first electro-magnetic receiver is farther from the electro-magnetic transmitter than the second electro-magnetic receiver.

9. A method of monitoring a fluid in a borehole comprising:
   a. generating electrical fields in the fluid that each originate from substantially the same originating location and extend to multiple terminal locations that are distal from the originating location and remain substantially within the borehole in a path of fluid that flows through the borehole, and that each generate a current that varies with respect to a phase of the fluid encountered by each electrical field;
   b. strategically forming the electrical fields so that at least some of the electrical fields extend to radial distances from an axis of the borehole that are greater than radial distances to which other of the electrical fields extend;
   c. monitoring the electrical fields at the multiple terminal locations;
   d. obtaining values that represent a characteristic of the electric fields and comparing those values to one another; and
   e. identifying a phase of the fluid based on the step of comparing.

10. The method of claim 9, wherein the electrical fields substantially covers the borehole.

11. The method of claim 9, wherein the characteristic of the fluid comprises a phase of the fluid.

12. The method of claim 9, where the step of identifying a characteristic of the fluid comprises identifying a flow regime of the fluid, wherein the flow regime of the fluid is selected from the group consisting of include slug flow, bubble flow, wavy flow, annular flow, and combinations thereof.

13. The method of claim 9, wherein the step of generating electrical fields in the fluid comprises providing a transmitter and receivers in the borehole, supplying electricity to the transmitter disposed in the borehole, and varying a frequency of the electricity.

14. The method of claim 13, wherein the receivers are spaced at designated locations with respect to the transmitter so that electrical field lines are strategically formed.

15. The method of claim 14, wherein the electrical field lines are in a flow of fluid and which comprise sets of electrical field lines.

16. The method of claim 15, further comprising generating a three dimensional model of a fluid regime based on the steps of monitoring the electrical field lines.

17. A device for use in monitoring fluid in a borehole comprising:
an electro-magnetic transmitter;
an axis;
a power source in electrical communication with the electro-magnetic transmitter that is selectively operated at different frequencies; and
electro-magnetic receivers spaced axially away from the electro-magnetic transmitter along a straight line path that intersects the electro-magnetic transmitter and extends along the axis, so that when the power source energizes the electro-magnetic transmitter, electro-magnetic field lines are generated that remain substantially within the borehole and extend from the electro-magnetic transmitter to the electro-magnetic receivers, and in a path of fluid flowing in the borehole, so that an induced current is generated at each of the electro-magnetic receivers and that is dependent on a phase of the fluid intersected by certain electro-magnetic field lines.

18. The device of claim 17, wherein the electro-magnetic receivers and electro-magnetic transmitters comprise a first array assembly, the device further comprising a second array assembly that is oriented at an angle to the first array assembly.

19. The device of claim 17, further comprising a housing that contains the electro-magnetic receivers and electro-magnetic transmitters, and wherein the electro-magnetic receivers and electro-magnetic transmitters are disposed along a line that is substantially parallel with an axis of the housing.

20. The device of claim 17, wherein the electro-magnetic receivers are disposed at designated locations from the electro-magnetic transmitter so that the electrical field lines to a one of the electro-magnetic receivers depend a distance radially away from an axis of the borehole that is different from electrical field lines that extend to another one of the electro-magnetic receivers, and so that electrical field lines to a receiver farthest away from the electro-magnetic transmitter, depend substantially to an outer radius of the borehole, and wherein all of the electrical field lines remain within the borehole.

* * * * *